United States Patent
Li et al.

(10) Patent No.: US 9,600,771 B2
(45) Date of Patent: Mar. 21, 2017

(54) INFORMATION CODING BASED ON SEMANTIC DATA REASONING

(71) Applicant: Empire Technology Development LLC, Wilmington, DE (US)

(72) Inventors: Daqi Li, Shaanxi (CN); Jun Fang, Shaanxi (CN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 572 days.

(21) Appl. No.: 13/985,761

(22) PCT Filed: Oct. 31, 2012

(86) PCT No.: PCT/CN2012/083857
§ 371 (c)(1),
(2) Date: Aug. 15, 2013

(87) PCT Pub. No.: WO2014/067102
PCT Pub. Date: May 8, 2014

(65) Prior Publication Data
US 2014/0122408 A1 May 1, 2014

(51) Int. Cl.
G06N 5/04 (2006.01)
G06N 5/02 (2006.01)

(52) U.S. Cl.
CPC .................. *G06N 5/022* (2013.01)

(58) Field of Classification Search
None
See application file for complete search history.

(56) References Cited

U.S. PATENT DOCUMENTS

| 7,610,192 B1* | 10/2009 | Jamieson | G06Q 50/22 704/1 |
| 2002/0042695 A1* | 4/2002 | Kamiya | G06F 8/443 703/1 |
| 2009/0106202 A1* | 4/2009 | Mizrahi | G06F 17/30887 |

FOREIGN PATENT DOCUMENTS

| CN | 1700205 A | | 11/2005 |
| CN | 102194081 | * | 9/2011 |
| CN | 102194081 A | | 9/2011 |
| KR | 20030062463 A | | 7/2003 |

OTHER PUBLICATIONS

"Information Hiding", Fabien A.P. Petitcolas (Ed.), 5th International Workshop, IH 2002, 438 pages.*
"Digital Image Compression Algorithms and Standards", Weidong Kou, 1995, 201 pages.*
"Fast Pattern Matching in Strings" Donald E. Knuth, James H. Morris, Jr., Vaughan R. Pratt, SIAM Journal on Computing 6.2., 1977, pp. 323-350.*

(Continued)

*Primary Examiner* — Omar Fernandez Rivas
*Assistant Examiner* — Mai T Tran
(74) *Attorney, Agent, or Firm* — Brundidge & Stanger, P.C.

(57) ABSTRACT

Various embodiments of technologies for information coding based on semantic data reasoning are provided. In some examples, a process performs semantic reasoning on semantic sentences of a textual message to generate a code, and embeds the code in the textual message as additional information.

20 Claims, 5 Drawing Sheets

(56) References Cited

OTHER PUBLICATIONS

"Hiding the Hidden: A Software System for Concealing Ciphertext as Innocuous Text", Mark T. Chapman, Thesis, University of Wisconsin-Milwaukee, May 1997, 83 pages.*
"A fast multiple string pattern matching algorithm" Kim, Sun, Yanggon Kim. Proceedings of 17th AoM/IAoM Conference on Computer Science, 1999, 6 pages.*
International Search Report and Written Opinion from corresponding International Application No. PCT/CN12/083857 mailed May 19, 2013.
Lecroq T., Experimental Results on String-matching Algorithms, Softw. Pract. Exp., 1995, 25(7): 727-765.
Berry, et al., A Fast String Matching Algorithm and Experimental Results, Proceedings of the Prague stringology Club Workshop 9'9[C], 1999: 16-28.
Lee , et al., HAL: A Faster Match Algorithm, IEEE Trans on Knowledge and Data Engineering, 2002, 14(5): 1047-1058.
http://www.semagix.com/what-is-semantic-data.htm, 2013, 2 pages.
Berman F., "From TeraGrid to knowledge grid", Communications of the ACM, 2001, 44(11):27-28.
"Survey on Semantic Data Stores and Reasoning Engines", Version 1.1, Sep. 14, 2010.
"Interleaving Reasoning and Selection with Semantic with Semantic Data", Huang, Z., Proceedings of the 4th International Workshop on Ontology Dynamics (IWOD-10), ISWC2010 Workshop. 2010.
"Semantic data model," accessed at https://web.archive.org/web/20120622093006/https://en.wikipedia.org/wiki/Semantic_data_model, last modified on Dec. 26, 2011, pp. 4.

* cited by examiner

INFORMATION CODING BASED ON SEMANTIC DATA REASONING

CROSS-REFERENCE TO RELATED APPLICATION

This Application is the U.S. National Stage filing under 35 U.S.C. §371 of PCT Application Ser. No. PCT/CN2012/083857 filed on Oct. 31, 2012. The disclosure of the PCT Application is hereby incorporated herein by reference in its entirety.

BACKGROUND

Semantic data refers to data that can be interpreted meaningfully by a machine without human intervention. A semantic data model is typically a software engineering model based on relationships between stored symbols, or objects, and the real world. Data is organized based on binary models of objects, usually in groups of three parts: two objects and a relationship between the two objects. For example, a data organization that represents a cup sitting on a table might look like "cup table." The objects, i.e., cup and table, are interpreted with regards to their relationship, i.e., sitting on. The data is organized linearly, and the position of the objects reveals to software that the cup is sitting on the table and not the other way around. Accordingly, semantic data systems are designed to represent the real world as accurately as possible within the data set, and objects in the data set are organized linearly and hierarchically to give meanings to what they represent.

In a cloud-computing environment, data used for management, control, communication and other applications may be sent along with general messages that are transmitted over the network. Such data is typically short, and is discretely affixed to or embedded in the carrying message.

SUMMARY

In at least one embodiment, a method includes pretreating a textual message that includes a plurality of semantic sentences used for generating a sequence of binary bits, with each bit of the sequence of binary bits corresponding to a respective one of the semantic sentences, determining that the textual message is suitable to carry a code of a plurality of bits therein, and embedding the code in a subset of the plurality of semantic sentences in response to the determining.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict plural embodiments in accordance with the disclosure and are, therefore, not to be considered limiting of its scope, the disclosure will be described with additional specificity and detail through use of the accompanying drawings.

DETAILED DESCRIPTION

Figure 1:
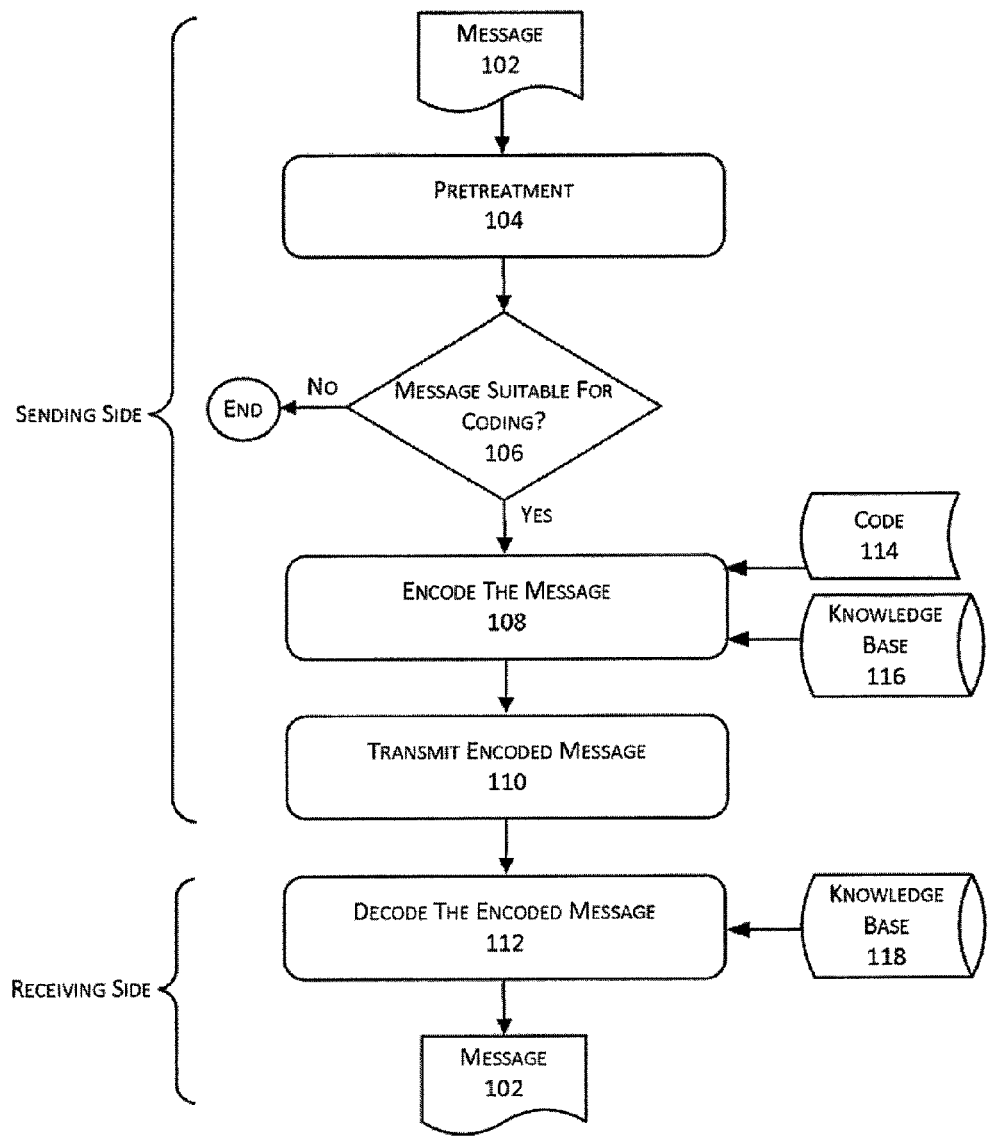
FIG. 1 shows an example scheme of information coding based on semantic data reasoning, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

Described herein are systems, apparatuses, computer program products, methods, and techniques related to embedding a code into a textual message based on semantic data reasoning. Some example implementations described herein include pretreating the textual message by segmenting the textual message into a plurality of individual semantic sentences and determining whether the textual message is suitable to carry the data. When it is determined that the textual message is suitable to carry the code, a subset of the plurality of semantic sentences is selected and the semantic sentences of the selected subset are tagged. A first knowledge base containing private information is utilized in the selection and tagging of semantic sentences. The code is embedded in the textual message, thus encoding the textual message, through the selection and tagging of select semantic sentences of the textual message. The encoded textual message is transmitted to a receiving party which can decode the encoded textual message to obtain the code using the first knowledge base or a second knowledge base that is a duplicate of the first knowledge base.

Overview

Typically, the content of a message implies or reflects certain private information about the author of the message. For example, a teacher can generally determine whether a student has mastered a given subject from the student's answers to questions of a test. In other words, the answers provided by the student reflect a level of knowledge of the student with respect to the subject being tested. As another example, when a user logs into a system, the user may be asked to answer a short question such that a correct answer to the short question implies the authenticity or identity of the user. Of course, such scenarios are not intended to be limiting in any manner. Instead, it is to be understood that information implied in a given message can be reasoned, or deduced, from each of one or more semantic sentences of the given message.

Assuming a result of deducing a conclusion from a semantic sentence can be treated as a Boolean value, a deduced conclusion consistent with the truth behind the semantic sentence can be represented by a bit value of 1 and a deduced conclusion inconsistent with the truth behind the semantic sentence can be represented by a bit value of 0. Thus, a message containing multiple semantic sentences can be seen and treated as a string of bits of 0 and 1 when each of the semantic sentences of the message is deduced to a conclusion that is either consistent or inconsistent with the truth. For instance, as an illustration using public knowledge, a message M containing the following three sentences can be expressed mathematically as M={0, 1, 0}: "There are more days in February than in March. There are fifty states in the United States of America. The weather is generally colder in summer than in winter." This is because the deduced conclusion of the first sentence, s1, is inconsistent with the truth, the deduced conclusion of the second sentence, s2, is consistent with the truth, and the deduced conclusion of the third sentence, s3, is inconsistent with the truth.

A knowledge base that contains privileged information, such as private information about an author of a message, for example, may be used to determine whether a deduced conclusion is consistent with the truth behind a respective semantic sentence. Accordingly, when a message has a multiple number of semantic sentences in a sufficiently large number as explained below, a given code of one or more bytes can be embedded, or carried, in a select number of semantic sentences of the message, in which the selected semantic sentences are selected in a sequence such that the bit value of the deduced conclusion of each selected semantic sentence represents a corresponding bit of the one or more bytes of the embedded code. The selected semantic sentences are tagged, or otherwise marked or highlighted, to identify them as the selected ones of the plurality of semantic sentences of the message that carry the code. The encoded message can be transmitted to a receiving party that has access to a knowledge base having the same privileged information, and the receiving party can recover the code by using the knowledge base.

FIG. 1 shows an example scheme 100 of information coding based on semantic data reasoning, arranged in accordance with at least some embodiments described herein.

According to scheme 100, on a sending side, a message may be a textual message containing one or more semantic sentences and encoded to carry a code as an encoded message, using a first knowledge base, and transmitted to a receiving side. On the receiving side, a second knowledge base may be used to decode the encoded message to obtain the original message. Mathematically, the message can be denoted as M, the first knowledge base can be denoted as K, the code can be denoted as I, and the encoded message can be denoted as M'. M={$S_1, S_2, \ldots, S_i, \ldots$} and $s_i$ is an arbitrary semantic sentence among the one or more semantic sentences of M. K is used in the deducing process and the deduced conclusion of $S_i$ may be consistent or inconsistent with the truth behind the respective semantic sentence, corresponding to Boolean value 1 and 0, respectively. I can be expressed as a sequence of binary bits such as $I=b_1 b_2 \ldots b_i$, where $b_i$ is the $i^{th}$ bit of I. For instance, a code I=1101 can be embedded in the encoded message M'={0, 1, 0, 1, 1, 0, 1, 0, 0, 1} when the Boolean values of the deduced conclusions of sentences $s_4$ through $s_7$ reflect those of the four bits of code I.

Further, the privileged information stored in the first knowledge base and the privileged information stored in second knowledge base may be identical. In at least some embodiments, the first knowledge base and the second knowledge base are the same knowledge base accessible by both a sending party and a receiving party. In at least some other embodiments, the second knowledge base is a duplicate copy of the first knowledge base. For example, the first knowledge base and the second knowledge base may be separate knowledge bases that are synchronized periodically so that the privileged information stored in the first knowledge base and the privileged information stored in the second knowledge base are identical. In the description herein, the mathematical symbol K is used to represent either the first knowledge base or the second knowledge base.

Example scheme 100 may include one or more operations, actions, or functions as illustrated by one or more blocks 104, 106, 108, 110, and/or 112, with references to one or more of a message 102, a code 114, a knowledge base 116, and/or a knowledge base 118. Although scheme 100 is illustrated as discrete blocks, various blocks may be divided into additional blocks, combined into fewer blocks, or eliminated, depending on the desired implementation. Processing may begin at block 104.

Block 104 (Pretreatment) may include pretreating message 102, or M, by preparing message 102 for determination of whether message 102 is suitable to carry code 114 and for subsequent encoding of message 102 to carry code 114 therein if it is determined that message 102 is suitable to carry code 114. For example, a processor or a computing device on the sending side (e.g., operated by a sending party) may pretreat M by segmenting M into a multiple number of individual semantic sentences, $s_1, s_2, \ldots s_i, \ldots$. In succession, the processor may deduce a respective conclusion from each semantic sentence and compare the conclusion to the privileged information in K to result in a binary bit in sequence R, namely $R=r_1 r_2 \ldots r_i$, for which $r_i$ is a bit corresponding to a result of comparison of the deduced conclusion and the privileged information in K with respect to semantic sentence $s_i$. The value of $r_i$ is 1 if the result of comparison is consistent, and 0 if inconsistent.

By way of example, suppose a receiving party, e.g., Jack, has one daughter whose name is Agnes. Then, if M includes a sentence $s_i$ that states "Jack has a daughter whose name is Jessica", then the result of a comparison of the deduced conclusion (i.e., the name of Jack's daughter is Jessica) and the privilege information in K (i.e., the name of Jack's daughter is Agnes) has a value of 0 since the deduced conclusion is inconsistent with the privileged information in K. This process can be formalized by using Description Logics, which is the logical foundation of semantic data, namely:

K={Jack O=1 hasDaughter, hasDaughter(Jack, Agnes)}
$S_i$=hasDaughter(Jack, Jessica)

On the sending side, $K \cup \{s_i\} = \perp$.

Thus, $s_i$ as deduced is inconsistent, and is depicted as $r_i \rightarrow 0$ or $r_i + 0$.

Decision block 106 (Message Suitable for Coding?) may include determining whether message 102 is suitable to carry code 114, as not all messages may be able to carry code 114 under scheme 100. If message 102 is determined to be suitable to carry code 114, processing under scheme 100 may proceed to block 108; otherwise, processing may end. Under scheme 100, two factors may be considered in determining whether message 102 is suitable to carry code 114, namely: length and semantic richness of message 102. For example, the processor may determine message 102 to be too short if message 102 does not have enough semantic sentences therein to represent the number of bits in code 114. On the other hand, the processor may determine that message 102 has a sufficiently large number of semantic sentences when the number of the semantic sentences in message 102 is greater than the number of bits in code 114. Moreover, if message 102 does not have sufficient semantic richness to support coding or embedding code 114 into message 102, the processor may determine that message 102 is not suitable to carry code 114 even if message 102 is long enough with a large number of semantic sentences.

In determining whether the length of message 102 is sufficient, example mathematical operations that can be performed are as follows:

1) Sum up the number of semantic sentences in M, denoted as n, for which n=|M|.

2) Calculate the number of bits in I, denoted as m, for which m is equal to 4 times the number of characters in I, including space and other invisible symbols.

3) If the relationship between m and n is satisfied with equation (1) below, then the length of message 102 is determined to be sufficiently long:

$$n \geq C_r \cdot m + c \quad (1)$$

Here, $C_r$ is the reduction ratio of compression algorithm which may be adopted in information transition. If no compression algorithm is used, then $C_r$=1. c is a redundancy number.

The determination of whether the semantic richness of message 102 is sufficient is a rough estimation. Even if the length of message 102 is long enough, low semantic richness can lead to failure in encoding message 102 with code 114. For example, when M has R=0101111, I=1000 cannot be coded into M even though the length of M is longer than I. An example pseudo code that tests the semantic richness of M for I is as follows:

```
Input: R_temp, R, l, n, m, n ≥ m
Output: num, the semantic richness
Start:
    Let R_temp = r_1 r_2 ... r_m, i = 1, num = 0
    If(i ≤ n)
    {
        i + +;
        R_temp left shift one bit and then append r_{m+i} to R_temp;
        If(match(R_temp, i)) num + +;
        Output num_i;
    }
End.
```

The function "match(string1, string2)" is defined to determine how many times string2 matches string1. Any one of numerous class match algorithms can be used to design this function, such as brute-force (BF), Knuth-Morris-Pratt (KMP), Boyers-Moore (BM) and so on. Once num≥1, I can be coded into M. When a gap of semantic richness between M and I is not large (e.g., not exceeding 5% of the number of bits in I), some tautology may be used to compensate the gap, for instance, by adding one or more accessorial sentences into message 102. For example, semantic data sentence such as "1=1", which would result in a deduced conclusion of "true with a Boolean value of 1, or a repetition of one of the sentences of M having a Boolean value of 1 for the deduced conclusion may be used complementarily when there lacks a suitable semantic sentence. If it is determined that message 102 is not suitable to carry code 114, then processing under scheme 100 may end as message 102 cannot be utilized to carry code 114. Processing may return to block 104 for a new message if and when the new message is available as a candidate message to carry code 114.

Block 108 (Encode the Message) may include tagging or otherwise marking message 102 to embed code 114 in message 102. For example, the processor may select some of the semantic sentences of message 102 such that the respective binary bit of comparison result of each of the selected semantic sentences represents a corresponding bit of code 114. In at least some embodiments, each of the selected semantic sentences may be appended with a prefix or a suffix to tag the selected semantic sentences. This way, as a decoding process on the receiving side is to be performed on just those semantic sentences in encoded message M' that are tagged or otherwise marked, considerable time can be saved. An example of tagging a selected semantic sentence is as follows:

Original sentence: Jack has a daughter whose name is Jessica.

Tagged sentence: ¤ Jack has a daughter whose name is Jessica.

Here, "¤" is a label used for tagging to indicate the immediately following sentence is a selected semantic sentence. Processing may proceed from block 108 to block 110.

Block 110 (Transmit Encoded Message) may include transmitting encoded message M', which carries I therein, from the sending party to the receiving party. For example, the processor on the sending side may cause the encoded message M' to be transmitted to the receiving side (e.g., a computing device operated by a receiving party) via any suitable means, e.g., over a wired medium, wireless medium or a combination thereof. As the encoding of message M to embed code I therein may be performed on the semantic level, no additional channel coding is necessary. Processing may proceed from block 110 to block 112.

Block 112 (Decode the Encoded Message) may include decoding M' by segmenting M' into a multiple number of individual semantic sentences. To recover the code I, a processor or a computing device on the receiving side (e.g., operated by the receiving party) may deduce a conclusion from each of those semantic sentences that are tagged, and compare the deduced conclusion to the privileged information in second knowledge base 118 with respect to the respective semantic sentence.

Example Applications

There are numerous applications in which scheme 100 can be implemented, including but not limited to, for example, data classification, primary rate interface (PRI) management and authentication. As an example of data classification applications, a message may be classified into, for example, 16 classes denoted by binary bits 0000 through 1111. The classes may be used to identify the type of content of the message. For example, class 1 (e.g., 0001 in binary) may be sports, class 2 (e.g., 0010 in binary) may be politics, class 3 (e.g., 0011 in binary) may be history, class 4 (e.g., 0100 in binary) may be economics, and so on. Accordingly, four semantic sentences may be selected from M to represent the corresponding four bits, with the corresponding bit $r_i$ of each of the four selected semantic sentences representing the respective bit of the 4-bit classification. As an illustrative example, M is assumed to be classified as a message of class 8, which is denoted as 1000 in binary, and the four selected semantic sentences are $s_2$, $s_3$, $s_5$ and $s_{12}$. A comparison of the deduced conclusion of each of $s_2$, $s_3$, $s_5$ and $s_{12}$ with K yields a consistent result for $s_2$ (i.e., $r_1$=1), an inconsistent result for $s_3$ (i.e., $r_2$=0), an inconsistent result for $s_5$ (i.e., $r_3$=0), and an inconsistent result for $s_{12}$ (i.e., $r_4$=0). Thus, the four semantic sentences $s_2$, $s_3$, $s_5$ and $s_{12}$ are selected to carry I, in this case classification of M, which is 1000. A special tag is appended as prefix to each of semantic sentences $s_2$, $s_3$, $s_5$ and $s_{15}$, and the encoded message M' is transmitted to a receiving party. The receiving party of M' compares the deduced conclusion of those semantic sentences that are tagged, namely $s_2$, $s_3$, $s_5$ and $s_{12}$, with K to obtain the code I, which is 1000, indicating content of M is classified as class 8.

As an example of PRI management applications, a message is assigned one of eight PRI levels that are respectively denoted by binary bits 0000 through 0011. Four semantic sentences are selected from M to represent corresponding bits of the PRI level of M. The encoded message, M', is transmitted over a network and each node in the path decodes M' to determine the PRI level of M to process M according to the corresponding PRI procedure.

As an example of authentication applications, the term "king" is the authenticated term and is divided into four characters, namely "k", "i", "n" and "g". The corresponding ASIIC code in binary bits are 01101011, 01101001, 01101110 and 01100111, respectively, for a total of thirty-two bits. Accordingly, thirty-two sentences are selected from M to represent the ASIIC binary bits of the authenticated term. On the receiving side, a received message passes the authentication when the message includes semantic sentences that yield comparison results $r_1 r_2 \ldots r_{32}$ that are identical to the ASIIC code of "king" in binary bits.

Example Processes

Figure 2:
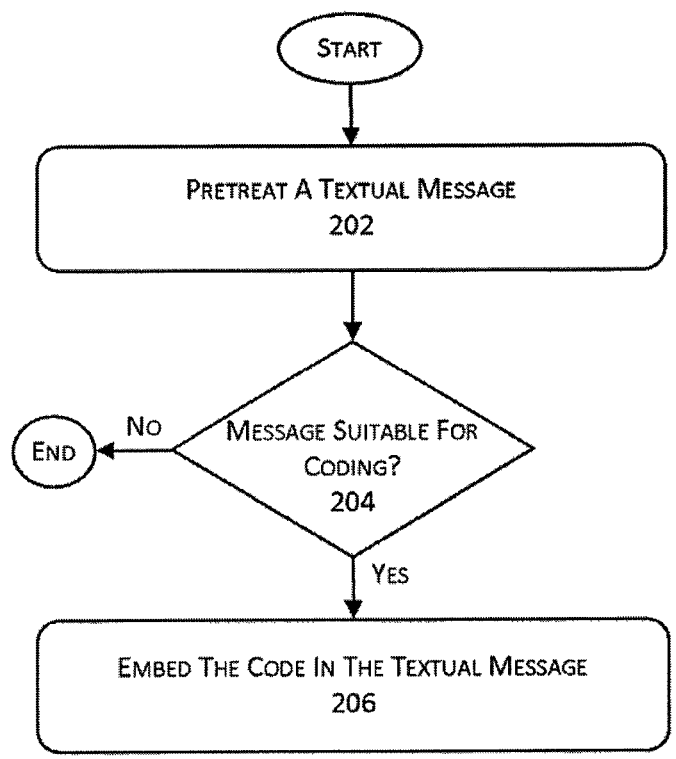
FIG. 2 shows a processing flow for information coding based on semantic data reasoning, arranged in accordance with at least some embodiments described herein.

FIG. 2 shows a processing flow 200 for information coding based on semantic data reasoning, arranged in accordance with at least some embodiments described herein.

Example processing flow 200 includes one or more operations, actions, or functions as illustrated by one or more of blocks 202, 204 and 206. Although illustrated as discrete blocks, various blocks may be divided into additional blocks, combined into fewer blocks, or eliminated, depending on the desired implementation. Further, processing flow 200 may be implemented by software, hardware, or a combination of software and hardware in any type of computing device, such as example computing device 500 to be described below. For illustrative purposes, the operations described below are performed by a processor of a computing device. Processing may begin at block 202.

Block 202 (Pretreat A Textual Message) may include pretreating a textual message that includes a multiple number of semantic sentences used for generating a sequence of binary bits, with each bit of the sequence of binary bits corresponding to a respective one of the semantic sentences. For example, a processor or a computing device on the sending side (e.g., operated by a sending party) may pretreat message 102 in two stages. First, message 102 may be segmented into a multiple number of semantic sentences as M={$s_1$, $s_2$, . . . $s_t$}. Then, the multiple semantic sentences may be analyzed to generate the sequence of binary bits. In at least some embodiments, in analyzing the multiple semantic sentences, the processor may generate a binary 0 when a concept conveyed by a respective one of the semantic sentences is false based on information in a knowledge base, such as knowledge base 116. Conversely, the processor may generate a binary 1 when the concept conveyed by the respective one of the semantic sentences is true based on the information in the knowledge base. In at least some embodiments, the information in the knowledge base is privileged information such as private information that is known to a sending party and a receiving party but not to others. Processing flow 200 may proceed from block 202 to block 204.

Block 204 (Message Suitable for Coding?) may include determining whether the textual message is suitable to carry a code of a multiple number of bits therein. If message 102 is determined to be suitable to carry code 114, then processing flow 200 may proceed to block 206; otherwise, processing flow 200 may end. For example, the processor may determine that message 102 is suitable to carry code 114, which has a multiple number of bits, when a length of message 102 is suitable to carry code 114 and semantic richness of message 102 is sufficient to carry code 114. In at least some embodiments, the processor may determine that the length of message 102 is suitable to carry code 114 based on a number of factors. Such factors may include, for example: (1) a quantity of the multiple number of semantic sentences in message 102, (2) a quantity of the multiple number of bits in code 114, and (3) that a sum of a redundancy number and a product of the quantity of the multiple number of semantic sentences in message 102 and a reduction ratio of compression algorithm is less than the quantity of the multiple number of bits in code 114. In at least some embodiments, in determining that the semantic richness of message 102 is sufficient to carry code 114, the processor may compare code 114 to the sequence of binary bits and determine that the multiple number of bits of code 114 can be represented by a corresponding number of binary bits of the sequence of binary bits. Processing flow 200 may proceed from block 204 to block 206.

Block 206 (Embed the Code in the Textual Message) may include embedding the code in a subset of the multiple semantic sentences in response to determining that the textual message is suitable to carry the code. For example, in embedding code 114 in a subset of the semantic sentences of message 102, the processor may select the subset of the multiple number of semantic sentences to carry code 114 in message 102 such that a pattern of the binary bits corresponding to the subset of the multiple number of semantic sentences match a pattern of the multiple number of bits of code 114. Further, the processor may tag the subset of the multiple semantic sentences such that the binary bit corresponding to a respective one of the tagged semantic sentences indicates a respective one of the bits of code 114. In at least some embodiments, the processor may tag the tagged semantic sentences by prefixing each of the tagged semantic sentences with a label. In at least some other embodiments, the processor may tag the tagged semantic sentences by suffixing each of the tagged semantic sentences with a label. In still some other embodiments, the processor may tag the tagged semantic sentences by highlighting the tagged semantic sentences in a way that is recognizable by the receiving party.

In at least some embodiments, processing flow 200 may further include transmitting the textual message with the code embedded therein. For example, after encoding message 102 with code 114, the processor may transmit, or cause the associated computing device to transmit, the encoded message to the receiving party.

Figure 3:
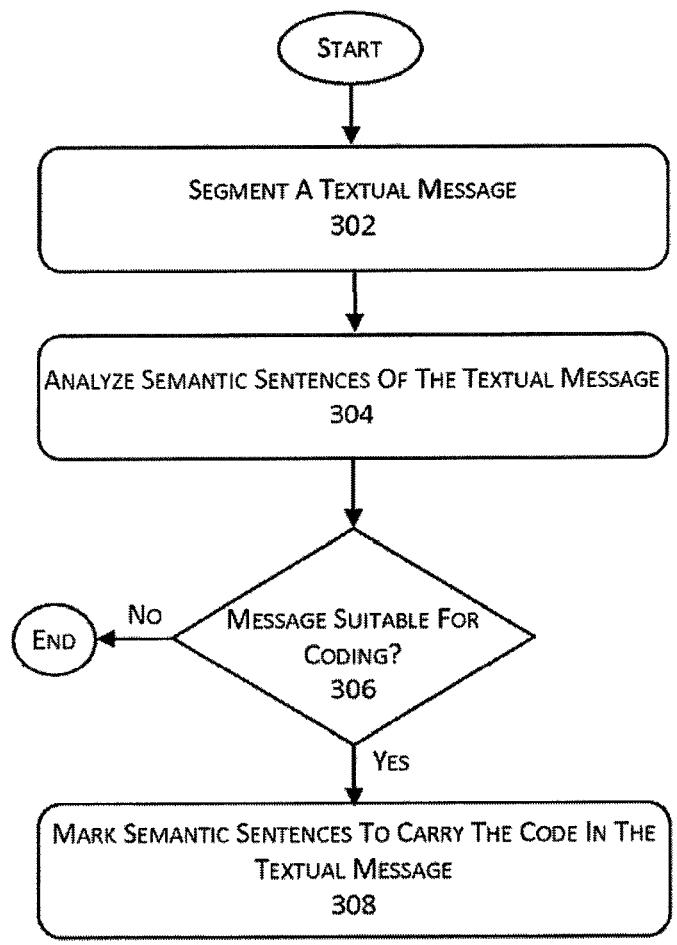
FIG. 3 shows another processing flow for information coding based on semantic data reasoning, arranged in accordance with at least some embodiments described herein.

FIG. 3 shows a processing flow 300 for information coding based on semantic data reasoning, arranged in accordance with at least some embodiments described herein.

Example processing flow 300 includes one or more operations, actions, or functions as illustrated by one or more of blocks 302, 304, 306 and 308. Although illustrated as discrete blocks, various blocks may be divided into additional blocks, combined into fewer blocks, or eliminated, depending on the desired implementation. Further, processing flow 300 may be implemented by software, hardware, or a combination of software and hardware in any type of computing device, such as example computing device 500 to be described below. For illustrative purpose, the operations described below are performed by a processor of a computing device. Processing may begin at block 302.

Block 302 (Segment A Textual Message) may include segmenting a textual message into a multiple number of semantic sentences. For example, a processor or computing device may segment message 102 into a multiple number of semantic sentences as $M=\{s_1, s_2, \ldots s_i\}$. Processing flow 300 may proceed from block 302 to block 304.

Block 304 (Analyze Semantic Sentences of the Textual Messages) may include analyzing the multiple semantic sentences to generate a sequence of binary bits, with each bit of the sequence of binary bits corresponding to a respective one of the semantic sentences. In at least some embodiments, in analyzing the multiple semantic sentences of message 102, the processor may generate a binary 0 when a concept conveyed by a respective one of the semantic sentences is false based on information in a knowledge base, such as knowledge base 116. Conversely, when a concept conveyed by the respective one of the semantic sentences is true based on information in the knowledge base, the processor may generate a binary 1. In at least some embodiments, the information in the knowledge base may be privileged information such as private information that is known to a sending party and a receiving party but not to others. Processing flow 300 may proceed from block 304 to block 306.

Block 306 (Message Suitable for Coding?) may include determining whether the textual message is suitable to carry a code of a multiple number of bits therein. If the textual message is determined to be suitable to carry the code, then processing flow 300 may proceed to block 308; otherwise, processing flow 300 may end. For example, the processor may determine that message 102 is suitable to carry code 114 therein when the processor determines that a length of message 102 is suitable to carry code 114 and that semantic richness of message 102 is sufficient to carry code 114. In at least some embodiments, the processor may determine that the length of message 102 is suitable to carry code 114 based on a number of factors. Such factors may include, for example: (1) a quantity of the multiple number of semantic sentences in message 102, (2) a quantity of the multiple number of bits in code 114, and (3) that a sum of a redundancy number and a product of the quantity of the multiple number of semantic sentences in message 102 and a reduction ratio of compression algorithm is less than the quantity of the multiple number of bits in code 114. In at least some embodiments, the processor may determine that the semantic richness of message 102 is sufficient to carry code 114 by comparing code 114 to the sequence of binary bits and determining that the multiple numbers of bits of code 114 can be represented by a corresponding number of binary bits of the sequence of binary bits. Processing flow 300 may proceed from block 306 to block 308.

Block 308 (Mark Semantic Sentences to Carry the Code in the Textual Message) may include marking a subset of the multiple semantic sentences to carry the code in the textual message. For example, the processor may mark the subset of the multiple semantic sentences of message 102 such that the binary bit corresponding to each of the marked semantic sentences indicates a respective one of the bits of code 114. In at least some embodiments, the processor may mark the marked semantic sentences by prefixing each of the marked semantic sentences with a label. In at least some other embodiments, the processor may mark the marked semantic sentences by suffixing each of the marked semantic sentences with a label. In still some other embodiments, the processor may mark the marked semantic sentences by highlighting the marked semantic sentences in a way that is recognizable by the receiving party.

In at least some embodiments, processing flow 300 may further include transmitting the textual message with the code embedded therein. For example, after encoding message 102 with code 114, the processor transmits, or causes the associated computing device to transmit, the encoded message to the receiving party.

Figure 4:
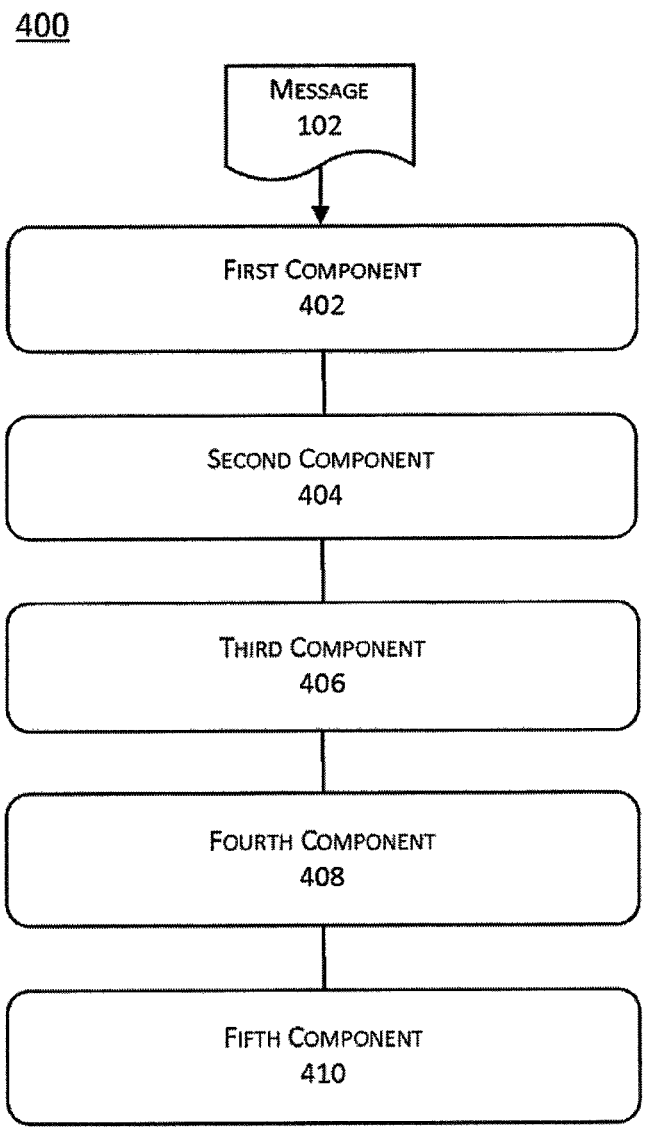
FIG. 4 shows an example system that is configured to perform information coding based on semantic data reasoning, arranged in accordance with at least some embodiments described herein.

FIG. 4 shows a system 400 that is configured to perform information coding based on semantic data reasoning, arranged in accordance with at least some embodiments described herein.

Example system 400 may include one or more components, parts or modules as illustrated by one or more of first component 402, second component 404, third component 406, and fourth component 408. Although illustrated as discrete components, various components may be divided into additional components, combined into fewer components, or eliminated, depending on the desired implementation. Further, system 400 may be implemented by software, hardware, or a combination of software and hardware in any type of computing device, such as example computing device 500 to be described below.

First component 402 may be configured to segment a textual message into a multiple number of semantic sentences. For example, first component 404 may segment message 102 into a multiple number of semantic sentences as $M=\{s_1, s_2, \ldots s_i, \ldots\}$.

Second component 404 may be configured to analyze the multiple semantic sentences to generate a sequence of binary bits, with each bit of the sequence of binary bits corresponding to a respective one of the semantic sentences. In at least some embodiments, second component 404 may analyze the multiple semantic sentences and generate a binary 0 when a concept conveyed by a respective one of the semantic sentences is false based on information in a knowledge base, such as first knowledge base 116. Conversely, second component 404 may generate a binary 1 when the concept conveyed by the respective one of the semantic sentences is true based on the information in the knowledge base.

Third component 406 may be configured to determine whether the textual message is suitable to carry a code of a multiple number of bits therein. In at least some embodiments, third component 406 may determine that message 102 is suitable to carry code 114 when third component 406 determines that a length of message 102 is suitable to carry code 114 and that semantic richness of message 102 is sufficient to carry code 114. In at least some embodiments, third component 406 may determine that the length of message 102 is suitable to carry code 114 based on a number of factors. Such factors may include, for example: (1) a quantity of the multiple number of semantic sentences in message 102, (2) a quantity of the multiple number of bits in code 114, and (3) that a sum of a redundancy number and a product of the quantity of the multiple number of semantic sentences in message 102 and a reduction ratio of compression algorithm is less than the quantity of the multiple number of bits in code 114. In at least some embodiments, third component 406 may determine that the semantic richness of message 102 is sufficient to carry code 114 by comparing code 114 to the sequence of binary bits and determining that the multiple numbers of bits of code 114 can be represented by a corresponding number of binary bits of the sequence of binary bits.

Fourth component 408 may be configured to mark a subset of the multiple semantic sentences to carry the code in the textual message in response to a positive determination that the textual message is suitable to carry a code of a multiple number of bits therein. In at least some embodiments, fourth component 408 may mark a subset of the multiple semantic sentences to carry code 114 in message 102 by marking the subset of the multiple semantic sentences such that the binary bit corresponding to each of the marked semantic sentences indicates a respective one of the bits of code 114. In at least some embodiments, fourth component 408 may mark the marked semantic sentences by prefixing each of the marked semantic sentences with a label. In at least some other embodiments, fourth component 408 may mark the marked semantic sentences by suffixing each of the marked semantic sentences with a label. In still some other embodiments, fourth component 408 may mark the marked semantic sentences by highlighting the marked semantic sentences in a way that is recognizable by the receiving party.

In at least some embodiments, system 400 may further include fifth component 410 that may be configured to transmit the textual message with the subset of the multiple number of semantic sentences being marked. For example, fifth component 410 may transmit the encoded message to the receiving party that has access to first knowledge base 116 or has second knowledge base 118 which is a duplicate copy of first base 116.

Embodiments of the proposed technique advantageously provide an additional layer of security as well as efficiency in data communication. Further, the proposed technique offers many applications in a cloud-computing environment such as data classification, authentication and PRI management.

Example Computing Device

Figure 5:
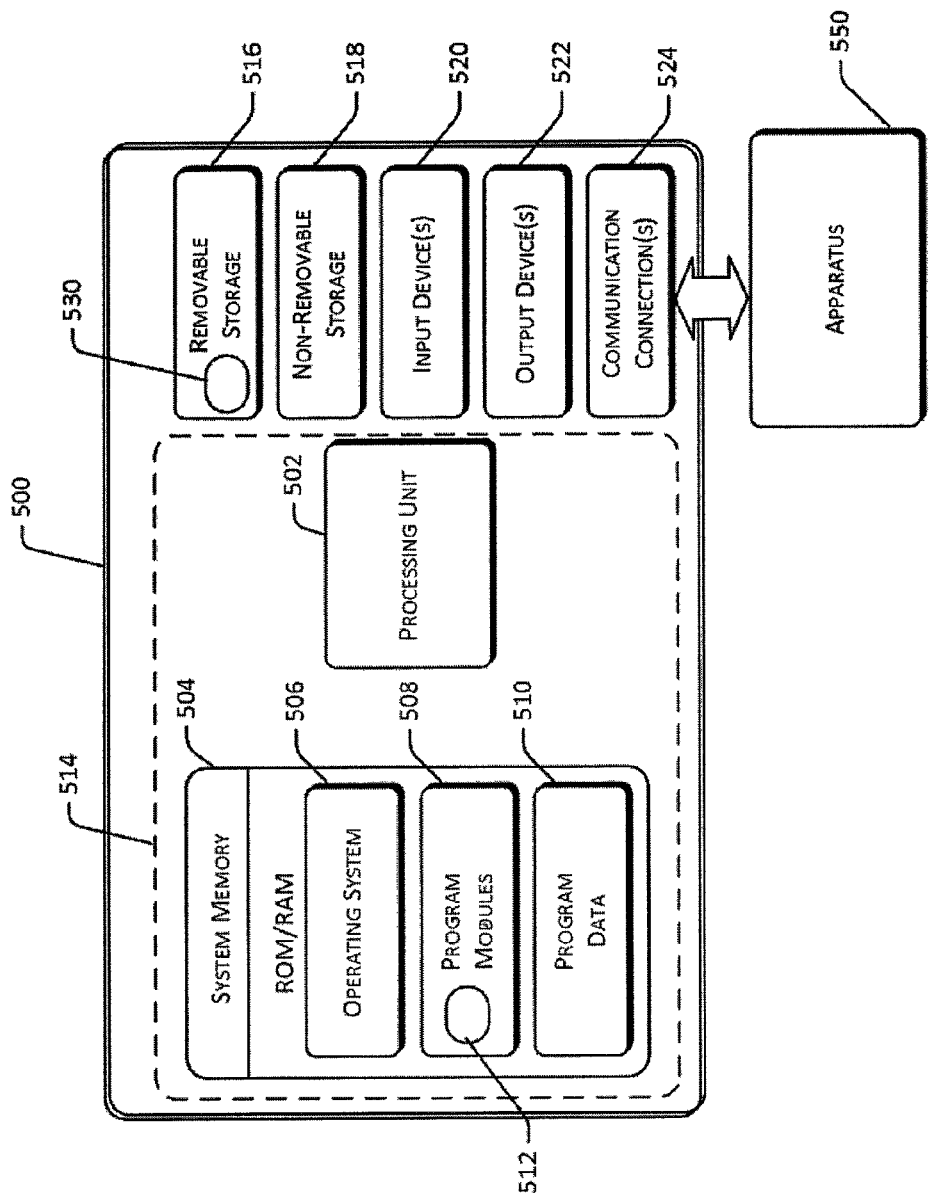
FIG. 5 shows an example computing device that is configured to implement operations of one or more embodiments of information coding based on semantic data reasoning, arranged in accordance with at least some embodiments described herein.

FIG. 5 shows an example computing device 500 that is configured to implement operations of one or more embodiments of information coding based on semantic data reasoning, arranged in accordance with at least some embodiments described herein.

It will be readily appreciated that the techniques disclosed herein may be implemented in other computing devices, systems, and environments. The computing device 500 shown in FIG. 5 is one example of a computing device and not intended to suggest any limitation as to the scope of use or functionality of the computer and network architectures.

In at least one implementation, computing device 500 may include at least one processing unit 502 and system memory 504. Depending on the exact configuration and type of computing device, system memory 504 may be volatile (such as RAM), non-volatile (such as ROM, flash memory, etc.) or some combination thereof. System memory 504 may include an operating system 506, one or more program modules 508, and may include program data 510. A basic implementation of the computing device 500 is demarcated by a dashed line 514.

The program module 508 may include a module 512 configured to implement the technique as described above. For example, the module 512 include a set of computer-executable instructions or program codes that, when executed by the processing unit 502, may cause the processing unit 502 to carry out processing flows 200, 300 and/or 400, and any variations thereof, e.g., the computing device 500 may perform the operations as described above with respect to processing flows 200, 300 and/or 400.

Computing device 500 may have additional features or functionality. For example, computing device 500 may also include additional data storage devices such as removable storage 516 and non-removable storage 518. In at least some implementations, the removable storage 516 and non-removable storage 518 are an example of computer accessible media for storing computer-executable instructions or program codes that are executable by the processing unit 502 to perform the various functions described above. Generally, any of the functions described with reference to the figures can be implemented using software, firmware, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device, e.g., computing device 500. Any of such computer accessible media may be part of the computing device 500.

In one implementation, the removable storage 516, which may be a computer accessible medium, has a set of computer-executable instructions 530 stored thereon. When executed by the processing unit 502, the set of computer-executable instructions 530 cause the processing unit 502 to execute operations, tasks, functions and/or methods as described above, including processing flows 200, 300 and/or 400 and any variations thereof.

Computing device 500 may also include one or more input devices 520 such as keyboard, mouse, pen, voice input device, touch input device, etc. Computing device 500 may additionally include one or more output devices 522 such as a display, speakers, printer, etc.

Computing device 500 may also include one or more communication connections 524 that allow the computing device 500 to communicate with apparatus 550. For example, computing device 500 may be used by the sending party and apparatus 550 may be used by the receiving party in various examples described above.

Upon executing the set of computer-executable instructions, whether stored in module 512 of program module 508 or in removable storage 516, processing unit 502 may direct computing device 500 or apparatus 550 to carry out a number of operations to implement the technique as described above, including processing flows 200, 300 and/or 400 and any variations thereof.

It is appreciated that the illustrated computing device 500 is one example of a suitable device and is not intended to suggest any limitation as to the scope of use or functionality of the various embodiments described.

Additional and Alternative Implementation Notes

In the above description of example implementations, for purposes of explanation, specific numbers, materials configurations, and other details are set forth in order to better explain the invention, as claimed. However, it will be apparent to one skilled in the art that the claimed invention may be practiced using different details than the example ones described herein. In other instances, well-known features are omitted or simplified to clarify the description of the example implementations.

The inventor intends the described example implementations to be primarily examples. The inventor does not intend these example implementations to limit the scope of the appended claims. Rather, the inventor has contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The example processes discussed herein are illustrated as a collection of blocks in a logical flow graph, which represents a sequence of operations that can be implemented with hardware, software, firmware, or any combination thereof. In the context of software/firmware, the blocks represent instructions stored on one or more processor-readable storage media that, when executed by one or more processors, perform the recited operations. The operations of the example processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

We claim:

1. A method, comprising:
   pretreating a textual message that includes a plurality of semantic sentences suitable for use in generating a sequence of binary bits, with each bit of the sequence of binary bits corresponding to a respective one of the semantic sentences;
   determining that a number of the plurality of semantic sentences in the textual message is of a sufficient number to carry a code, wherein the code includes one or more bits;
   selecting a subset of the plurality of semantic sentences to carry the code;
   embedding the code in the selected subset of the plurality of semantic sentences to generate a pattern of binary bits, wherein the pattern of binary bits corresponding to the selected subset of the plurality of semantic sentences matches a pattern of the one or more bits of the code; and
   tagging the selected subset of the plurality of semantic sentences.

2. The method of claim 1, wherein the pretreating a textual message comprises:
   segmenting the textual message into the plurality of semantic sentences; and
   analyzing the plurality of semantic sentences to generate the sequence of binary bits.

3. The method of claim 2, wherein the analyzing the plurality of semantic sentences to generate a sequence of binary bits comprises:
   generating a binary 0 when a concept conveyed by a respective one of the semantic sentences is false based on information in a knowledge base; and
   generating a binary 1 when the concept conveyed by the respective one of the semantic sentences is true based on the information in the knowledge base.

4. The method of claim 3, wherein the information in the knowledge base comprises private information.

5. The method of claim 1, further comprising determining that a semantic richness of the textual message is sufficient to carry the code, by:
   comparing the code to the sequence of binary bits; and
   determining that the one or more bits of the code can be represented by a corresponding number of binary bits of the sequence of binary bits.

6. The method of claim 1, wherein the tagging the subset of the plurality of semantic sentences comprises tagging the selected subset of the plurality of semantic sentences such that the binary bit corresponding to each of the tagged semantic sentences indicates a respective one of the bits of the code.

7. The method of claim 1, wherein the tagging the selected subset of the plurality of semantic sentences comprises prefixing each of the subset of the plurality of semantic sentences with a label.

8. The method of claim 1, further comprising:
transmitting the textual message with the code embedded therein.

9. The method of claim 8, wherein the pretreating a textual message comprises:
pretreating the textual message using a knowledge base, and
wherein the transmitting the textual message comprises transmitting the textual message to a receiving party having a duplicate copy of the knowledge base.

10. A non-transitory computer-readable medium storing instructions that, when executed, cause one or more processor to perform operations comprising:
segmenting a textual message into a plurality of semantic sentences;
analyzing the plurality of semantic sentences to generate a sequence of binary bits, wherein each bit of the sequence of binary bits corresponds to a respective one of the plurality of semantic sentences;
determining that a number of the plurality of semantic sentences is suitable to carry a code, wherein the code includes one or more bits;
determining that semantic richness of the textual message is sufficient to carry the code;
selecting a subset of the plurality of semantic sentences to carry the code;
marking the selected subset of the plurality of semantic sentences to carry the code in the textual message; and
transmitting the textual message with the code embedded in the marked selected subset of the plurality of semantic sentences, wherein a pattern of the binary bits corresponding to the selected subset of the plurality of semantic sentences matches a pattern of the one or more bits of the code.

11. The non-transitory computer-readable medium of claim 10, wherein the determining that semantic richness of the textual message is sufficient to carry the code comprises:
comparing the code to the sequence of binary bits; and
determining that the one or more bits of the code can be represented by a corresponding number of binary bits of the sequence of binary bits.

12. The non-transitory computer-readable medium of claim 10, wherein the marking the selected subset of the plurality of semantic sentences comprises prefixing each of the subsets of the plurality of semantic sentences with a label.

13. The non-transitory computer-readable medium of claim 10, wherein the analyzing the plurality of semantic sentences comprises:
analyzing the plurality of semantic sentences using a knowledge base, and
wherein the transmitting the textual message comprises transmitting the textual message to a receiving party having a duplicate copy of the knowledge base.

14. An apparatus, comprising:
a processor coupled to a memory storing executable components, the processor operable to execute or facilitate execution of one or more of the executable components, the executable components comprising:
a first component configured to segment a textual message into a plurality of semantic sentences;
a second component configured to analyze the plurality of semantic sentences to generate a sequence of binary bits, with each bit of the sequence of binary bits corresponding to a respective one of the semantic sentences;
a third component configured to determine that the textual message is suitable to carry a code, wherein the code includes one or more bits;
a fourth component configured to mark a subset of the plurality of semantic sentences to carry the code in the textual message in response to the third component determining that the textual message is suitable to carry the code; and
a fifth component configured to transmit the textual message with the code embedded in the marked subset of the plurality of semantic sentences, wherein a pattern of the binary bits corresponding to the marked subset of the plurality of semantic sentences matches a pattern of the one or more bits of the code.

15. The apparatus of claim 14, wherein the second component is configured to analyze the plurality of semantic sentences to generate a sequence of binary bits by performing operations comprising:
generating a binary 0 when a concept conveyed by a respective one of the semantic sentences is false based on information in a knowledge base; and
generating a binary 1 when the concept conveyed by the respective one of the semantic sentences is true based on the information in the knowledge base.

16. The apparatus of claim 15, wherein the information in the knowledge base comprises private information.

17. The apparatus of claim 14, wherein the third component is configured to determine that the textual message is suitable to carry code that includes one or more bits by performing operations comprising:
determining that a length of the textual message is suitable to carry the code; and
determining that semantic richness of the textual message is sufficient to carry the code.

18. The apparatus of claim 17, wherein the third component is configured to determine that semantic richness of the textual message is sufficient to carry the code by performing operations comprising:
comparing the code to the sequence of binary bits; and
determining that the one or more bits of the code can be represented by a corresponding number of binary bits of the sequence of binary bits.

19. The apparatus of claim 14, wherein the fourth component is configured to mark the subset of the plurality of semantic sentences by prefixing each of the subset of the plurality of semantic sentences with a label.

20. The apparatus of claim 14, wherein the second component is configured to analyze the plurality of semantic sentences by analyzing the plurality of semantic sentences using a knowledge base, and wherein the fifth component is configured to transmit the textual message by transmitting the textual message to a receiving party having a duplicate copy of the knowledge base.

* * * * *